United States Patent
Watanabe et al.

(10) Patent No.: US 9,011,273 B2
(45) Date of Patent: Apr. 21, 2015

(54) MULTI-PIECE SOLID GOLF BALL

(71) Applicant: Bridgestone Sports Co., Ltd., Minato-ku, Tokyo (JP)

(72) Inventors: Hideo Watanabe, Chichibu (JP); Atsuki Kasashima, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 14/147,755

(22) Filed: Jan. 6, 2014

(65) Prior Publication Data

US 2014/0194221 A1 Jul. 10, 2014

(30) Foreign Application Priority Data

Jan. 9, 2013 (JP) ................................. 2013-001697

(51) Int. Cl.
- *A63B 37/06* (2006.01)
- *A63B 37/00* (2006.01)

(52) U.S. Cl.
CPC ......... *A63B 37/0092* (2013.01); *A63B 37/0076* (2013.01)

(58) Field of Classification Search
CPC ..................... A63B 37/0084; A63B 37/0068
USPC ..................................................... 473/376
See application file for complete search history.

(56) References Cited

U.S. PATENT DOCUMENTS

| | | | |
|---|---|---|---|
| 5,306,760 | A | 4/1994 | Sullivan |
| 5,312,857 | A | 5/1994 | Sullivan |
| 6,194,505 | B1 | 2/2001 | Sone et al. |
| 6,642,314 | B2 | 11/2003 | Sone et al. |
| 6,743,122 | B2 | 6/2004 | Hayashi et al. |
| 7,294,680 | B2 | 11/2007 | Sone et al. |
| 8,414,425 | B2 | 4/2013 | Kasashima et al. |
| 2003/0158312 | A1 | 8/2003 | Chen |

FOREIGN PATENT DOCUMENTS

| | | |
|---|---|---|
| JP | 11-35633 A | 2/1999 |
| JP | 11-164912 A | 6/1999 |
| JP | 2000-061000 A | 2/2000 |
| JP | 2000-061001 A | 2/2000 |
| JP | 2002-293996 A | 10/2002 |
| JP | 2011-092708 A | 5/2011 |
| WO | 98/46671 A1 | 10/1998 |

*Primary Examiner* — Raeann Gorden

(74) *Attorney, Agent, or Firm* — Sughrue Mion, PLLC

(57) ABSTRACT

A golf ball has a core, an envelope layer, an intermediate layer and a cover whose respective surface hardnesses have been set so as to satisfy certain specific relationships. In addition, the respective initial velocities measured for the core, a sphere composed of the core peripherally covered by the envelope layer (envelope layer-encased sphere), a sphere composed of the core peripherally covered by the envelope layer and the intermediate layer (intermediate layer-encased sphere), and the ball itself have been set so as to satisfy certain specific relationships. This golf ball is able to exhibit an excellent flight performance not only when struck by mid head-speed golfers, but even when struck by low head-speed golfers, in addition to which it also has a good feel at impact and an excellent durability to repeated impact.

9 Claims, 1 Drawing Sheet

MULTI-PIECE SOLID GOLF BALL

CROSS-REFERENCE TO RELATED APPLICATION

This non-provisional application claims priority under 35 U.S.C. §119(a) on Patent Application No. 2013-001697 filed in Japan on Jan. 9, 2013, the entire contents of which are hereby incorporated by reference.

BACKGROUND OF THE INVENTION

1. Field of the Invention

The present invention relates to a multi-piece solid golf ball having a core, an envelope layer, an intermediate layer and a cover. More specifically, the invention relates to a multi-piece solid golf ball which exhibits an excellent flight performance not only in the mid head-speed range, but also in the low head-speed range, and which is also endowed with a good feel at impact and an excellent durability to repeated impact.

2. Prior Art

Numerous golf balls which have an excellent flight performance and excellent spin properties when hit at high head speeds and are also capable of providing a good feel at impact have hitherto been developed in order to address the needs of professional golfers and skilled amateurs. However, because such balls are generally designed so as to achieve an optimal amount of deformation when struck at a high head speed, amateur golfers having a low head speed are often unable to impart sufficient deformation to the ball. Hence, the inherent performance of such balls cannot be manifested when played by low head-speed golfers, as a result of which the balls fail to achieve a sufficient distance and have a poor feel at impact.

Developing a golf ball to which even a low head-speed golfer can impart sufficient deformation and which has an excellent flight performance and a good feel at impact is thus important for expanding the golfer base.

Prior-art publications relating to this invention include JP-A 2011-092708, JP-A 2000-61001 and JP-A 2000-61000.

In view of the foregoing, an object of the present invention is to provide a multi-piece solid golf ball which is capable of manifesting an excellent flight performance not only when played by mid head-speed golfers, but even when played by low head-speed golfers, and which moreover has a good feel at impact and an excellent durability to repeated impact.

SUMMARY OF THE INVENTION

We have discovered that, in a golf ball having a core, an envelope layer, an intermediate layer and a cover, by setting the respective surface hardnesses of these layers and the respective initial velocities of the core, a sphere obtained by forming the envelope layer over the core (envelope layer-encased sphere), a sphere obtained by forming the envelope layer and the intermediate layer over the core (intermediate layer-encased sphere) and the ball itself so as to satisfy certain specific relationships, an excellent flight performance can be exhibited not only in the mid head-speed range, but even in the low head-speed range. We have also found that, by optimizing the respective materials used to form the envelope layer, the intermediate layer and the cover over the core, a multi-piece solid golf ball endowed with both a good feel at impact and excellent durability to repeated impact can be obtained.

Accordingly, the invention provides a multi-piece solid golf ball having a core, an envelope layer, an intermediate layer and a cover, wherein the core, the envelope layer, the intermediate layer and the cover have respective surface hardnesses which satisfy the relationship:

core surface hardness>envelope layer surface hardness<intermediate layer surface hardness<cover surface hardness;

and the core surface hardness and the envelope layer surface hardness, expressed as Shore D hardnesses, satisfy the relationship:

$-40 \leq$ (envelope layer surface hardness−core surface hardness)$\leq -5$.

In addition, the core and the ball have respective initial velocities which satisfy the relationship:

$-0.6$ m/s$\leq$(ball initial velocity−core initial velocity)$\leq 0$ m/s;

a sphere composed of the core covered peripherally by the envelope layer and the intermediate layer (intermediate layer-encased sphere) and the ball have respective initial velocities which satisfy the relationship:

$-0.4$ m/s$\leq$(ball initial velocity−intermediate layer-encased sphere initial velocity)$\leq 0.4$ m/s;

and a sphere composed of the core covered peripherally by the envelope layer (envelope layer-encased sphere) and the intermediate layer-encased sphere have respective initial velocities which satisfy the relationship:

$-0.2$ m/s$\leq$(intermediate layer-encased sphere initial velocity−envelope layer-encased sphere initial velocity).

In the multi-piece solid golf ball of the invention, the envelope layer surface hardness and the intermediate layer surface hardness, expressed as Shore D hardnesses, preferably satisfy the relationship:

$10 \leq$ (intermediate layer surface hardness−envelope layer surface hardness)$\leq 50$.

In the multi-piece solid golf ball of the invention, the intermediate layer surface hardness and the cover surface hardness, expressed as Shore D hardnesses, preferably satisfy the relationship:

$5 \leq$ (cover surface hardness−intermediate layer surface hardness)$\leq 20$.

In the multi-piece solid golf ball of the invention, the initial velocity of the envelope layer and the initial velocity of the ball preferably satisfy the relationship:

$0.1$ m/s$\leq$(ball initial velocity−envelope layer-encased sphere initial velocity)$\leq 0.8$ m/s, and the core initial velocity and the ball initial velocity preferably satisfy the relationship:

$-0.5$ m/s$\leq$(ball initial velocity−core initial velocity)$\leq 0$ m/s.

In the multi-piece solid golf ball of the invention, it is preferable for the envelope layer, the intermediate layer and the cover to have thicknesses which satisfy the relationship:

envelope layer thickness$\leq$intermediate layer thickness$\leq$cover thickness.

In the multi-piece solid golf ball of the invention, the intermediate layer and the cover to have specific gravities preferably satisfy the relationship:

cover specific gravity$\geq$intermediate layer specific gravity.

In the multi-piece solid golf ball of the invention, the intermediate layer may be formed of a resin composition obtained by blending as essential components:

100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (B) a non-ionomeric thermoplastic elastomer in a weight ratio between 100:0 and 50:50;

(C) from 5 to 80 parts by weight of a fatty acid and/or fatty acid derivative having a molecular weight of from 228 to 1500; and (D) from 0.1 to 17 parts by weight of a basic inorganic metal compound capable of neutralizing un-neutralized acid groups in components A and C.

In the multi-piece solid golf ball of the invention, the envelope layer may be formed of a thermoplastic polyether ester elastomer In the multi-piece solid golf ball of the invention, the cover may be formed of a resin composition obtained by blending together an ionomer resin and a granular inorganic filler.

This invention makes it possible to obtain golf balls which are capable of exhibiting an excellent flight performance not only when struck by mid head-speed golfers but also when struck by low head-speed golfers, and which, moreover, are endowed with both a good feel at impact and excellent durability to repeated impact.

BRIEF DESCRIPTION OF THE DIAGRAMS

DETAILED DESCRIPTION OF THE INVENTION

The objects, features and advantages of the invention will become more apparent from the following detailed description, taken in conjunction with the foregoing diagrams.

Figure 1:
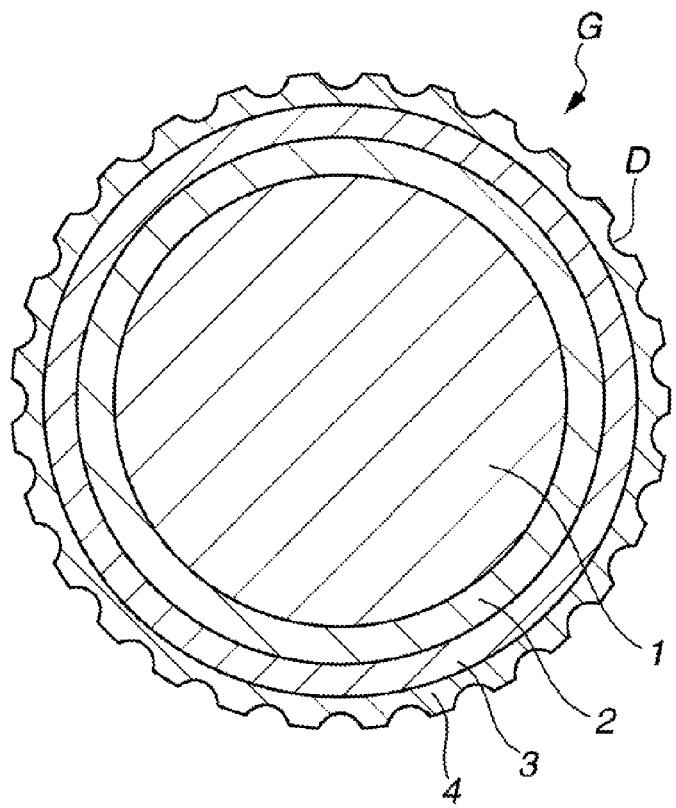
FIG. 1 is a schematic cross-sectional diagram showing the structure of a golf ball according to the invention.

The multi-piece solid golf ball of the invention has, arranged in order from the inside of the golf ball: a solid core, an envelope layer, an intermediate layer and a cover. FIG. 1 shows the structure of the inventive golf ball. The golf ball G shown in FIG. 1 has a core 1, an envelope layer 2 which encases the core 1, an intermediate layer 3 which encases the envelope layer 2, and a cover 4 which encases the intermediate layer 3. Numerous dimples D are generally formed on the surface of the cover 3 in order to improve the aerodynamic properties. Each of these layers is described in detail below.

In this specification, "mid head speed" refers to a golf club head speed of from about 36 m/s to about 44 m/s, and "low head speed" refers to a golf club head speed of from about 25 m/s to about 35 m/s.

In the practice of the invention, the solid core may be formed using a known rubber composition. Although not particularly limited, preferred examples include rubber compositions formulated as shown below.

A material composed primarily of rubber may be used to form the core. By way of illustration, the core may be formed using a rubber composition which contains a base rubber and, for example, a co-crosslinking agent, an organic peroxide, an inert filler, sulfur, an antioxidant and an organic sulfur compound.

Polybutadiene is preferably used as the base rubber of the rubber composition. It is desirable for this polybutadiene to have a cis-1,4 bond content on the polymer chain of at least 60 wt %, preferably at least 80 wt %, more preferably at least 90 wt %, and most preferably at least 95 wt %. Too low a cis-1,4 bond content among the bonds on the molecule may result in a lower rebound. Moreover, the polybutadiene has a 1,2-vinyl bond content on the polymer chain of preferably not more than 2 wt %, more preferably not more than 1.7 wt %, and even more preferably not more than 1.5 wt %. Too high a 1,2-vinyl bond content may lower the rebound.

To obtain a molded and vulcanized rubber composition having a good resilience, the polybutadiene used in the invention is preferably one synthesized with a rare-earth catalyst or a Group VIII metal compound catalyst. Polybutadiene synthesized with a rare-earth catalyst is especially preferred.

Such rare-earth catalysts are not subject to any particular limitation. Exemplary rare-earth catalysts include those made up of a combination of a lanthanide series rare-earth compound with an organoaluminum compound, an alumoxane, a halogen-bearing compound and an optional Lewis base.

Examples of suitable lanthanide series rare-earth compounds include halides, carboxylates, alcoholates, thioalcoholates and amides of atomic number 57 to 71 metals.

In the practice of the invention, the use of a neodymium catalyst in which a neodymium compound serves as the lanthanide series rare-earth compound is particularly advantageous because it enables a polybutadiene rubber having a high cis-1,4 bond content and a low 1,2-vinyl bond content to be obtained at an excellent polymerization activity. Suitable examples of such rare-earth catalysts include those mentioned in JP-A 11-35633, JP-A 11-164912 and JP-A 2002-293996.

To increase the rebound, it is preferable for polybutadiene synthesized using a lanthanide series rare-earth compound catalyst to account for at least 10 wt %, preferably at least 20 wt %, and more preferably at least 40 wt %, of the rubber components.

Rubber components other than the above-described polybutadiene may be included in the rubber composition, insofar as the objects of the invention are attainable. Illustrative examples of rubber components other than the above-described polybutadiene include other polybutadienes, and other diene rubbers, such as styrene-butadiene rubber, natural rubber, isoprene rubber and ethylene-propylene-diene rubber.

Examples of suitable co-crosslinking agents include unsaturated carboxylic acids and the metal salts of unsaturated carboxylic acids.

Specific examples of unsaturated carboxylic acids include acrylic acid, methacrylic acid, maleic acid and fumaric acid. Acrylic acid and methacrylic acid are especially preferred.

The metal salts of unsaturated carboxylic acids, while not subject to any particular limitation, are exemplified by the above-mentioned unsaturated carboxylic acids neutralized with desired metal ions. Specific examples include the zinc and magnesium salts of methacrylic acid and acrylic acid. The use of zinc acrylate is especially preferred.

The unsaturated carboxylic acids and/or metal salts thereof are included in an amount, per 100 parts by weight of the base rubber, of preferably at least 5 parts by weight, more preferably at least 10 parts by weight, and even more preferably at least 15 parts by weight. The amount included is preferably not more than 60 parts by weight, more preferably not more than 50 parts by weight, even more preferably not more than 40 parts by weight, and most preferably not more than 30 parts by weight. Too much may make the core too hard, giving the ball an unpleasant feel at impact, whereas too little may lower the rebound.

The organic peroxide may be a commercially available product, suitable examples of which include Percumyl D (available from NOF Corporation), Perhexa 3 M (NOF Corporation), Perhexa C40 (NOF Corporation) and Luperco 231 XL (Atochem Co.). The use of one of these alone is preferred.

The amount of organic peroxide included per 100 parts by weight of the base rubber is preferably at least 0.1 part by weight, more preferably at least 0.3 part by weight, even more preferably at least 0.5 part by weight, and most preferably at least 0.7 part by weight. The upper limit in the amount included is preferably not more than 5 parts by weight, more preferably not more than 4 parts by weight, even more preferably not more than 3 parts by weight, and most preferably not more than 2 parts by weight. Too much or too little organic peroxide may make it impossible to achieve a ball having a good feel, durability and rebound.

Examples of preferred inert fillers include zinc oxide, barium sulfate and calcium carbonate. These may be used singly or as a combination of two or more thereof.

The amount of inert filler included per 100 parts by weight of the base rubber is preferably at least 1 part by weight, and more preferably at least 5 parts by weight. The upper limit in the amount included is preferably not more than 100 parts by weight, more preferably not more than 80 parts by weight, and even more preferably not more than 60 parts by weight. Too much or too little inert filler may make it impossible to achieve a proper weight and a good rebound.

In addition, an antioxidant may be optionally included. Illustrative examples of suitable commercial antioxidants include Nocrac NS-6, Nocrac NS-30 and Nocrac 200 (all available from Ouchi Shinko Chemical Industry Co., Ltd.), and Yoshinox 425 (available from Yoshitomi Pharmaceutical Industries, Ltd.). These may be used singly or as a combination of two or more thereof.

The amount of antioxidant included can be set to more than 0, and may be set to an amount per 100 parts by weight of the base rubber which is preferably at least 0.05 part by weight, and more preferably at least 0.1 part by weight. The maximum amount included, although not subject to any particular limitation, may be set to an amount per 100 parts by weight of the base rubber which is preferably not more than 3 parts by weight, more preferably not more than 2 parts by weight, even more preferably not more than 1 part by weight, and most preferably not more than 0.5 part by weight. Too much or too little antioxidant may make it impossible to achieve a suitable core hardness gradient, a good rebound and durability, and a spin rate-lowering effect on full shots.

In the practice of the invention, an organosulfur compound may be optionally included in the rubber composition so as to enhance the core rebound. In cases where an organosulfur compound is included, the content thereof per 100 parts by weight of the base rubber may be set to preferably at least 0.05 part by weight, and more preferably at least 0.1 part by weight. The upper limit in the organosulfur compound content may be set to preferably not more than 5 parts by weight, more preferably not more than 4 parts by weight, and even more preferably not more than 2 parts by weight. Including too little organosulfur compound may make it impossible to obtain a sufficient core rebound-increasing effect. On the other hand, if too much is included, the core hardness may become too low, worsening the feel of the ball on impact, and the durability of the ball to cracking when repeatedly struck may worsen.

The rubber composition containing the various above ingredients is prepared by mixture using a typical mixing apparatus, such as a Banbury mixer or a roll mill. When this rubber composition is used to mold the core, molding may be carried out by compression molding or injection molding using a specific mold for molding cores. The resulting molded body is then heated and cured under temperature conditions sufficient for the organic peroxide and co-crosslinking agent included in the rubber composition to act, thereby giving a core having a specific hardness profile. The vulcanization conditions in this case, while not subject to any particular limitation, are generally set to conditions of about 130 to 170° C., and especially 150 to 160° C., for 10 to 40 minutes, and especially 12 to 20 minutes.

The core diameter, although not subject to any particular limitation, may be set to from 30 to 40 mm. In this case, the lower limit is preferably at least 32 mm, more preferably at least 34 mm, and even more preferably at least 35 mm. The upper limit may be set to preferably not more than 39 mm, more preferably not more than 38 mm, and even more preferably not more than 36 mm.

The core has a center hardness, expressed as the JIS-C hardness, which, although not particularly limited, may be set to preferably at least 55, more preferably at least 57, and even more preferably at least 59. The upper limit in the JIS-C hardness may be set to preferably not more than 68, more preferably not more than 65, and even more preferably not more than 64. The center hardness of the core, expressed in terms of the Shore D hardness, is preferably at least 34, more preferably at least 35, and even more preferably at least 37. The upper limit is preferably not more than 44, more preferably not more than 42, and even more preferably not more than 41. If the center hardness of the core is too low, the durability to cracking under repeated impact may worsen. On the other hand, if the center hardness of the core is too high, the spin rate may rise excessively, possibility resulting in a poor distance.

The core has a surface hardness, expressed as the JIS-C hardness, which, although not particularly limited, may be set to preferably at least 65, more preferably at least 70, and even more preferably at least 72. The upper limit in the JIS-C hardness may be set to preferably not more than 85, more preferably not more than 80, and even more preferably not more than 77. The surface hardness of the core, expressed in terms of the Shore D hardness, is preferably at least 41, more preferably at least 45, and even more preferably at least 47. The upper limit is preferably not more than 57, more preferably not more than 53, and even more preferably not more than 51. If the surface hardness of the core is too low, the spin rate may rise excessively or the rebound may decrease, possibly resulting in a poor distance. On the other hand, if the surface hardness of the core is too high, the feel of the ball at impact may become too hard or the durability to cracking under repeated impact may worsen.

Here, "center hardness" refers to the hardness measured at the center of a cross-section obtained by cutting the core in half through the center, and "surface hardness" refers to the hardness measured at the surface of the core (spherical surface). Also, "JIS-C hardness" refers to the hardness measured with the JIS-C type spring durometer specified in JIS K 6301-1975, and "Shore D hardness" refers to the hardness measured with a type D durometer in accordance with ASTM D2240-95.

The cross-sectional hardness at a position midway between the center and the surface of the core, expressed as the JIS-C hardness, although not particularly limited, may be set to preferably at least 52, more preferably at least 54, and even more preferably at least 56. The upper limit in the JIS-C hardness is preferably not more than 65, more preferably not more than 63, and even more preferably not more than 61. The above cross-sectional hardness, expressed as the Shore D hardness, is preferably at least 32, more preferably at least 33, and even more preferably at least 35. The upper limit is preferably not more than 41, more preferably not more than 40, and even more preferably not more than 38. In cases where the cross-sectional hardness falls outside of the suitable range, the spin rate may rise, which may result in a poor distance, and the durability to cracking under repeated impact may worsen.

The hardness difference between the center and surface of the core, expressed as the JIS-C hardness, although not particularly limited, may be set to preferably at least 10, more preferably at least 13, and even more preferably at least 15. The upper limit, expressed in terms of JIS-C hardness, may be set to preferably not more than 30, more preferably not more than 25, and even more preferably not more than 20. The above hardness difference, expressed in terms of Shore D hardness, is preferably at least 8, more preferably at least 10, and even more preferably at least 11. The upper limit is preferably not more than 23, more preferably not more than 19, and even more preferably not more than 15. If this hardness difference is too small, the spin rate-lowering effect on shots with a driver (W#1) may be inadequate, as a result of which a good distance may not be achieved. On the other hand, if the hardness difference is too large, the initial velocity on actual shots may become low, as a result of which a good distance may not be achieved, or the durability to cracking on repeated impact may worsen.

The core has a deflection when compressed under a final load of 1,275 N (130 kgf) from an initial load state of 98 N (10 kgf) which, although not particularly limited, may be set within the range of from 2.5 to 8.0 mm. The lower limit may be set to preferably at least 3.0 mm, and more preferably at least 3.8 mm. The upper limit may be set to preferably not more than 6.0 mm, and more preferably not more than 5.0 mm. If the core is harder than the above range (i.e., if the deflection is too small), the spin rate may rise excessively, resulting in a poor distance, or the feel of the ball at impact may be too hard. On the other hand, if the core is softer than the above range (i.e., if the deflection is too large), the rebound may become too low, resulting in a poor distance, the feel of the ball may become too soft, or the durability to cracking on repeated impact may worsen.

The core has a specific gravity which, although not particularly limited, may be set within the range of from 1.02 to 1.4. The lower limit is preferably at least 1.1, and more preferably at least 1.15. The upper limit may be set to not more than 1.3, and more preferably not more than 1.2.

In this invention, by using the above material to form the solid core 1, the rebound can be increased, thus making it possible to provide a golf ball that is capable of achieving a stable trajectory.

The core structure is not limited to a single layer, and may be a multilayer structure of two or more layers. By giving the core a multilayer structure, the spin rate on shots with a driver can be lowered, enabling the distance to be increased even further. In addition, the spin properties and feel of the ball at the time of impact can also be improved. In such cases, the core has at least an inner core layer (inner sphere) and an outer core layer.

Next, the envelope layer formed over the core is described.

A known resin may be used as the material that forms the envelope layer, and is not particularly limited, although use may be made of one, two or more selected from the group consisting of ionomer resins and urethane, amide, ester, olefin and styrene-based thermoplastic elastomers. In this invention, because a high rebound can be obtained within the desired hardness range, especially preferred use can be made of a thermoplastic polyether ester elastomer.

The envelope layer has a material hardness, expressed as the Shore D hardness, which, although not particularly limited, can be set to generally at least 15, preferably at least 20, and more preferably at least 25. The upper limit in the Shore D hardness can be set to generally not more than 40, preferably not more than 35, and more preferably not more than 30. Here and below, "material hardness" refers to the hardness measured for a test specimen obtained by molding the material to be measured into a sheet of a specific thickness and using a type D durometer in accordance with ASTM D2240.

The sphere obtained by peripherally covering the core with an envelope layer (envelope layer-encased sphere) has a surface hardness, expressed as the Shore D hardness, which, although not particularly limited, can be set to generally at least 21, preferably at least 26, and more preferably at least 31. The upper limit can be set to generally not more than 46, preferably not more than 41, and more preferably not more than 36.

If the material hardness and the surface hardness are too low, the spin rate on full shots may rise excessively, possibly resulting in a poor distance, and the durability to cracking on repeated impact may worsen. On the other hand, if the material hardness and the surface hardness are too high, the durability to cracking on repeated impact may worsen or the spin rate on full shots may rise, possibly resulting in a poor distance, particularly on shots taken at a low head speed. In addition, the feel of the ball at impact may worsen.

The envelope layer has a thickness which, although not particularly limited, may be set to preferably at least 0.6 mm, more preferably at least 0.8 mm, and even more preferably at least 1.1 mm. The upper limit may be set to preferably not more than 2.1 mm, more preferably not more than 1.6 mm, and even more preferably not more than 1.4 mm. If the envelope layer is too thin, the durability to cracking on repeated impact may worsen and the feel of the ball at impact may worsen. On the other hand, if the envelope layer is too thick, the spin rate may rise on full shots, possibly resulting in a poor distance.

The envelope layer-encased sphere has a deflection when compressed under a final load of 1,275 N (130 kgf) from an initial load state of 98 N (10 kgf) which, although not particularly limited, may be set within the range of 2.5 to 7.6 mm. The lower limit may be set to preferably at least 3.0 mm, and more preferably at least 3.8 mm. The upper limit may be set to preferably not more than 5.7 mm, and more preferably not more than 4.7 mm. If the envelope layer-encased sphere is harder than the above range (i.e., the deflection is too small), the spin rate on full shots may rise excessively, possibly resulting in a poor distance, or the feel of the ball at impact may be too hard. On the other hand, if the envelope layer-encased sphere is softer than the above range (i.e., the deflection is too large), the feel of the ball at impact may be too soft or the durability to cracking on repeated impact may worsen.

Next, the intermediate layer formed over the envelope layer is described.

The material used to form the intermediate layer may be a know resin and is not subject to any particular limitation, although a preferred example of the material is a resin composition obtained by blending, as essential components: 100 parts by weight of a resin component composed of, in admixture, (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and (B) a non-ionomeric thermoplastic elastomer in a weight ratio between 100:0 and 50:50;

(C) from 5 to 80 parts by weight of a fatty acid and/or fatty acid derivative having a molecular weight of from 228 to 1500; and (D) from 0.1 to 17 parts by weight of a basic inorganic metal compound capable of neutralizing un-neutralized acid groups in components A and C.

Components A to D are described below.

Component A serves as the base resin of the material used to form the intermediate layer, and contains above components (a-1) and (a-2) in a given ratio.

The olefin in the base resin, whether in component (a-1) or component (a-2), has a number of carbons which is generally at least 2 but not more than 8, and preferably not more than 6. Specific examples include ethylene, propylene, butene, pentene, hexene, heptene and octene. Ethylene is especially preferred.

Examples of the unsaturated carboxylic acid in the base resin include acrylic acid, methacrylic acid, maleic acid and fumaric acid. Acrylic acid and methacrylic acid are especially preferred.

The unsaturated carboxylic acid ester of component (a-2) is preferably a lower alkyl ester of the above unsaturated carboxylic acid. Specific examples include methyl methacrylate, ethyl methacrylate, propyl methacrylate, butyl methacrylate, methyl acrylate, ethyl acrylate, propyl acrylate and butyl acrylate. Butyl acrylate (n-butyl acrylate, i-butyl acrylate) is especially preferred.

The olefin-unsaturated carboxylic acid random copolymer of component (a-1) and the olefin-unsaturated carboxylic acid-unsaturated carboxylic acid ester random terpolymer of component (a-2) (these are referred to collectively below as "random copolymers") can each be obtained by copolymerizing the respective above olefins, unsaturated carboxylic acids and, where necessary, unsaturated carboxylic acid esters using a known method.

It is recommended that the random copolymers have unsaturated carboxylic acid contents (acid contents) which are regulated. Here, it is recommended that the content of unsaturated carboxylic acid present in the random copolymer serving as component (a-1), although not subject to any particular limitation, be set to preferably at least 4 wt %, more preferably at least 6 wt %, even more preferably at least 8 wt %, and most preferably at least 10 wt %. Also, it is recommended that the upper limit be preferably not more than 30 wt %, more preferably not more than 20 wt %, even more preferably not more than 18 wt %, and most preferably not more than 15 wt %.

Similarly, the content of unsaturated carboxylic acid present in the random copolymer serving as component (a-2), although not subject to any particular limitation, may be set to preferably at least 4 wt %, more preferably at least 6 wt %, and even more preferably at least 8 wt %. Also, it is recommended that the upper limit be preferably not more than 15 wt %, more preferably not more than 12 wt %, and even more preferably not more than 10 wt %. If the acid content of the random copolymer is too low, the resilience may decrease, whereas if it is too high, the processability may decrease.

The metal ion neutralization products of the random copolymers of components (a-1) and (a-2) may be obtained by neutralizing some of the acid groups on the random copolymer with metal ions. Here, specific examples of metal ions for neutralizing the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Of these, preferred use can be made of, for example, $Na^+$, $Li^+$, $Zn^{++}$ and $Mg^{++}$. Moreover, from the standpoint of improving resilience, the use of $Na^+$ is recommended. The degree of neutralization of the random copolymer by these metal ions is not subject to any particular limitation. Such neutralization products may be obtained by a known method. For example, use may be made of a method in which neutralization is carried out with a compound such as a formate, acetate, nitrate, carbonate, bicarbonate, oxide, hydroxide or alkoxide of the above metal ions.

Sodium ion-neutralized ionomer resins may be suitably used as the metal ion neutralization products of the random copolymers to increase the melt flow rate (MFR) of the material. In this way, adjustment of the material to the subsequently described optimal melt flow rate is easy, enabling the moldability to be improved.

Commercially available products may be used as above components (a-1) and (a-2). Illustrative examples of the random copolymer in component (a-1) include Nucrel N1560, Nucrel N1214, Nucrel N1035 and Nucrel AN4221C (all products of DuPont-Mitsui Polychemicals Co., Ltd.), and Escor 5200, Escor 5100 and Escor 5000 (all products of ExxonMobil Chemical). Illustrative examples of the random copolymer in component (a-2) include Nucrel AN4311, Nucrel AN4318 and Nucrel AN4319 (all products of DuPont-Mitsui Polychemicals Co., Ltd.), and Escor ATX325, Escor ATX320 and Escor ATX310 (all products of ExxonMobil Chemical).

Illustrative examples of the metal ion neutralization product of the random copolymer in component (a-1) include Himilan 1554, Himilan 1557, Himilan 1601, Himilan 1605, Himilan 1706, Himilan 1707 and Himilan AM7311 (all products of DuPont-Mitsui Polychemicals Co., Ltd.), Surlyn 7930 (E.I. DuPont de Nemours & Co.), and Iotek 3110 and Iotek 4200 (both products of ExxonMobil Chemical). Illustrative examples of the metal ion neutralization product of the random copolymer in component (a-2) include Himilan 1855, Himilan 1856 and Himilan AM7316 (all products of DuPont-Mitsui Polychemicals Co., Ltd.), Surlyn 6320, Surlyn 8320, Surlyn 9320 and Surlyn 8120 (all products of E.I. DuPont de Nemours & Co.), and Iotek 7510 and Iotek 7520 (both products of ExxonMobil Chemical). Sodium-neutralized ionomer resins that are suitable as the metal ion neutralization product of the random copolymer include Himilan 1605, Himilan 1601 and Himilan 1555.

When preparing the base resin, component (a-1) and component (a-2) are admixed in a weight ratio of generally between 100:0 and 0:100, preferably between 100:0 and 25:75, more preferably between 100:0 and 50:50, even more preferably between 100:0 and 75:25, and most preferably 100:0. If too little component (a-1) is included, the molded material obtained therefrom may have a decreased resilience.

The processability of the base resin can be further improved by, in addition to adjusting the above mixing ratio, also adjusting the mixing ratio between the random copolymers and the metal ion neutralization products of the random copolymers. In this case, it is recommended that the weight ratio of the random copolymers to the metal ion neutralization products of the random copolymers be set to generally between 0:100 and 60:40, preferably between 0:100 and 40:60, more preferably between 0:100 and 20:80, and even more preferably 0:100. The addition of too much random copolymer may lower the uniformity of the pellet composition.

A non-ionomeric thermoplastic elastomer (B) may be included in the base resin so as to enhance even further both the feel of the ball on impact and the ball rebound. Examples of this component B include olefin elastomers, styrene elastomers, polyester elastomers, urethane elastomers and polyamide elastomers. In this invention, to further increase the rebound, it is preferable to use a polyester elastomer or an olefin elastomer. The use of an olefin elastomer composed of a thermoplastic block copolymer which includes crystalline polyethylene blocks as the hard segments is especially preferred.

A commercially available product may be used as component B. Illustrative examples include Dynaron (JSR Corporation) and the polyester elastomer Hytrel (DuPont-Toray Co., Ltd.). Component B may be included in an amount of more than 0.

The upper limit in the amount included per 100 parts by weight of the base resin, although not subject to any particular limitation, is preferably not more than 100 parts by weight, more preferably not more than 60 parts by weight, even more preferably not more than 50 parts by weight, and most preferably not more than 40 parts by weight. Too much component B may lower the compatibility of the mixture, possibly resulting in a substantial decline in the durability of the golf ball.

Next, a fatty acid or fatty acid derivative having a molecular weight of at least 228 but not more than 1500 may be added as component C to the base resin. Compared with the base resin, this component C has a very low molecular weight and, by suitably adjusting the melt viscosity of the mixture, helps in particular to improve the flow properties. Moreover, component C includes a relatively high content of acid groups (or derivatives thereof), and is capable of suppressing an excessive loss of resilience.

The molecular weight of the fatty acid or fatty acid derivative of component C may be set to at least 228, preferably at least 256, more preferably at least 280, and even more preferably at least 300. The upper limit may be set to not more than 1500, preferably not more than 1000, more preferably not more than 600, and even more preferably not more than 500. If the molecular weight is too low, the heat resistance cannot be improved. On the other hand, if the molecular weight is too high, the flow properties cannot be improved.

Preferred use as the fatty acid or fatty acid derivative of component C may likewise be made of, for example, an unsaturated fatty acid (or derivative thereof) containing a double bond or triple bond on the alkyl moiety, or a saturated fatty acid (or derivative thereof) in which the bonds on the alkyl moiety are all single bonds. In either case, it is recommended that the number of carbons on the molecule be preferably at least 18, more preferably at least 20, even more preferably at least 22, and most preferably at least 24. It is recommended that the upper limit be preferably not more than 80, more preferably not more than 60, even more preferably not more than 40, and most preferably not more than 30. Too few carbons may make it impossible to improve the heat resistance and may also make the acid group content so high as to diminish the flow-improving effect on account of interactions with acid groups present in the base resin. On the other hand, too many carbons increases the molecular weight, which may keep a distinct flow-improving effect from appearing.

Specific examples of the fatty acid of component C include myristic acid, palmitic acid, stearic acid, 12-hydroxystearic acid, behenic acid, oleic acid, linoleic acid, linolenic acid, arachidic acid and lignoceric acid. Preferred use can be made of stearic acid, arachidic acid, behenic acid and lignoceric acid in particular.

The fatty acid derivative of component C is exemplified by metallic soaps in which the proton on the acid group of the fatty acid has been replaced with a metal ion. Examples of the metal ion include $Na^+$, $Li^+$, $Ca^{++}$, $Mg^{++}$, $Zn^{++}$, $Mn^{++}$, $Al^{+++}$, $Ni^{++}$, $Fe^{++}$, $Fe^{+++}$, $Cu^{++}$, $Sn^{++}$, $Pb^{++}$ and $Co^{++}$. Of these, $Ca^{++}$, $Mg^{++}$ and $Zn^{++}$ are especially preferred.

Specific examples of fatty acid derivatives that may be used as component C include magnesium stearate, calcium stearate, zinc stearate, magnesium 12-hydroxystearate, calcium 12-hydroxystearate, zinc 12-hydroxystearate, magnesium arachidate, calcium arachidate, zinc arachidate, magnesium behenate, calcium behenate, zinc behenate, magnesium lignocerate, calcium lignocerate and zinc lignocerate. Of these, magnesium stearate, calcium stearate, zinc stearate, magnesium arachidate, calcium arachidate, zinc arachidate, magnesium behenate, calcium behenate, zinc behenate, magnesium lignocerate, calcium lignocerate and zinc lignocerate are preferred.

Use may also be made of known metallic soap-modified ionomers (see, for example, U.S. Pat. No. 5,312,857, U.S. Pat. No. 5,306,760 and International Disclosure WO 98/46671) when using above-described components (a-1) and/or (a-2), and component C.

The amount of component C included per 100 parts by weight of the resin component obtained by suitably blending above components (a-1), (a-2) and B may be set to at least 5 parts by weight, preferably at least 10 parts by weight, more preferably at least 20 parts by weight, and even more preferably at least 30 parts by weight. The upper limit in the amount included may be set to not more than 120 parts by weight, preferably not more than 115 parts by weight, more preferably not more than 110 parts by weight, and even more preferably not more than 100 parts by weight. If the amount of component C included is too small, the melt viscosity may decrease, lowering the processability. On the other hand, if the amount included is too large, the durability may decrease.

A basic inorganic metal compound capable of neutralizing acid groups in above components A and C may be added as component D. In cases where this component D is not included and a metal soap-modified ionomer resin (e.g., any of the metal soap-modified ionomer resins cited in the above-mentioned patent publications) is used alone, the metallic soap and un-neutralized acid groups present on the ionomer resin undergo exchange reactions during mixture under heating, generating a large amount of fatty acid. Because the fatty acid has a low thermal stability and readily vaporizes during molding, it may cause molding defects. Moreover, if the fatty acid deposits on the surface of the molded material, it may substantially lower paint film adhesion or have other undesirable effects such as lowering the resilience of the resulting molded material.

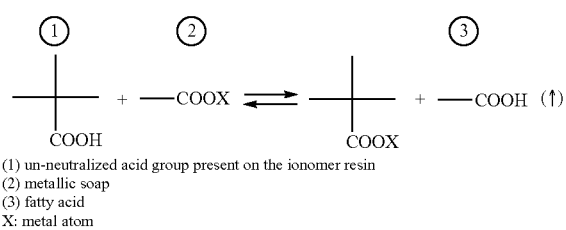

(1) un-neutralized acid group present on the ionomer resin
(2) metallic soap
(3) fatty acid
X: metal atom In the practice of the invention, by including component D, the acid groups present on components A and C are neutralized, enabling the generation of fatty acids which cause trouble such as molding defects to be suppressed. By thus including component D and suppressing the generation of fatty acids, the thermal stability of the material is increased. Other excellent properties imparted at the same time are a good moldability and an enhanced resilience as a golf ball material.

Component D is a basic inorganic metal compound which is capable of neutralizing the acid groups on components A and C. It is recommended that this be preferably a monoxide. Because this component D has a high reactivity with ionomer resins and the reaction by-products contain no organic matter, the degree of neutralization of the material can be increased without a loss of thermal stability.

Illustrative examples of the metal ions used in the basic inorganic metal compound include $Li^+$, $Na^+$, $K^+$, $Ca^{++}$, $Mg^{++}$, $Zn^{++}$, $Al^{+++}$, $Ni^{++}$, $Fe^{++}$, $Fe^{+++}$, $Cu^{++}$, $Mn^{++}$, $Sn^{++}$, $Pb^{++}$ and $Co^{++}$. Known basic inorganic fillers containing these metal ions may be used as the basic inorganic metal compound. Specific examples include magnesium oxide, magnesium hydroxide, magnesium carbonate, zinc oxide, sodium hydroxide, sodium carbonate, calcium oxide, calcium hydroxide, lithium hydroxide and lithium carbonate. In particular, a hydroxide or a monoxide is recommended. Calcium hydroxide and magnesium oxide, which have a high reactivity with the base resin, are more preferred. Magnesium oxide is especially preferred.

The amount of component D included per 100 parts by weight of the resin component may be set to at least 0.1 part by weight, preferably at least 0.5 part by weight, more preferably at least 1 part by weight, and even more preferably at least 1.2 parts by weight. The upper limit in the amount included may be set to not more than 17 parts by weight, preferably not more than 15 parts by weight, more preferably not more than 10 parts by weight, and even more preferably not more than 5 parts by weight. Too little component D fails to improve thermal stability and resilience, whereas too much instead lowers the heat resistance of the golf ball material owing to the presence of excess basic inorganic metal compound.

By blending specific respective amounts of components C and D with the resin component, i.e., the base resin (A) containing specific respective amounts of components (a-1) and (a-2) in admixture with optional component B, a material having excellent thermal stability, flow properties and moldability can be obtained, in addition to which the resilience of moldings obtained therefrom can be markedly improved.

It is recommended that the material formulated from specific amounts of the above-described resin component and components C and D have a high degree of neutralization (i.e., that the material be highly neutralized). Specifically, it is recommended that at least 50 mol %, preferably at least 60 mol %, more preferably at least 70 mol %, and even more preferably at least 80 mol %, of the acid groups in the material be neutralized. Highly neutralizing the acid groups in the material makes it possible to more reliably suppress the exchange reactions that cause trouble when only a base resin and a fatty acid or fatty acid derivative are used as in the above-cited prior art, thus preventing the generation of fatty acid. As a result, the thermal stability is substantially improved and the moldability is good, enabling molded products of much better resilience than prior-art ionomer resins to be obtained.

Here, "degree of neutralization" refers to the degree of neutralization of acid groups present within the mixture of component A serving as the base resin and the fatty acid or fatty acid derivative serving as component C, and differs from the degree of neutralization of the ionomer resin itself when an ionomer resin is used as the metal ion neutralization product of a random copolymer in component A. On comparing a mixture of the invention having a certain degree of neutralization with an ionomer resin alone having the same degree of neutralization, the material of the invention contains a very large number of metal ions owing to the inclusion of component D and thus has a higher density of ionic crosslinks which contribute to improved resilience, making it possible to confer the molded product with an excellent resilience.

The resin material should preferably have a melt flow rate (MFR) adjusted within a specific range so as to ensure flow properties that are particularly suitable for injection molding, and thus improve moldability. In this case, it is recommended that the melt flow rate, as measured in accordance with JIS K 7210 at a temperature of 190° C. and under a load of 21.18 N (2.16 kgf), be adjusted to preferably at least 0.6 g/10 min, more preferably at least 0.7 g/10 min, even more preferably at least 0.8 g/10 min, and most preferably at least 2 g/10 min. It is recommended that the upper limit be adjusted to preferably not more than 20 g/10 min, more preferably not more than 10 g/10 min, even more preferably not more than 5 g/10 min, and most preferably not more than 3 g/10 min. Too high or low a melt flow rate may result in a substantial decline in processability.

Various additives may be optionally included in the material containing above components A to D. For example, pigments, dispersants, antioxidants, ultraviolet absorbers and light stabilizers may be suitably included. The amount in which such additives are included, although not particularly limited, may be set to at least 0.1 part by weight, preferably at least 0.5 part by weight, and more preferably at least 1 part by weight, per 100 parts by weight of the resin component. The upper limit is generally not more than 10 parts by weight, preferably not more than 6 parts by weight, and even more preferably not more than 4 parts by weight.

The above material can be obtained by heating and mixing together components A to D. For example, the material may be obtained by using a known mixer such as a kneading type twin-screw extruder, a Banbury mixer or a kneader to mix these components at a heating temperature of from 150 to 250° C. Commercial products may be used for this purpose.

Specific examples include those having the trade names HPF 1000, HPF 2000, HPF AD1027, HPF AD1035 and HPF AD1040, as well as the experimental material HPF SEP1264-3 (all produced by E.I. DuPont de Nemours & Co.).

The method of forming the intermediate layer is not subject to any particular limitation, and may be a known method such as one that entails placing a pre-fabricated envelope layer-encased sphere inside a mold, and injection-molding over the sphere the intermediate layer-forming material prepared as described above.

The intermediate layer-forming material has a material hardness which, although not particularly limited, may be set to a Shore D hardness of typically at least 40, preferably at least 45, and more preferably at least 47. The upper limit, expressed as the Shore D hardness, may be set to typically not more than 60, preferably not more than 55, and more preferably not more than 53.

The sphere obtained by peripherally covering the core with an envelope layer and an intermediate layer (intermediate layer-encased sphere) has a surface hardness, expressed as the Shore D hardness, which, although not particularly limited, can be set to generally at least 46, preferably at least 51, and more preferably at least 53. The upper limit can be set to generally not more than 66, preferably not more than 61, and more preferably not more than 59.

If the above material hardness and the surface hardness are too low, the spin rate on full shots may rise excessively, possibly resulting in a poor distance, or the durability to cracking on repeated impact may worsen. On the other hand, if the material hardness and the surface hardness are too high, the durability to cracking on repeated impact may worsen, the spin rate on full shots may rise, resulting in a poor distance, or the feel of the ball at impact may worsen.

The intermediate layer has a thickness which, although not particularly limited, may be set to preferably at least 0.6 mm, more preferably at least 0.8 mm, and even more preferably at least 1.1 mm. The upper limit may be set to preferably not more than 2.1 mm, more preferably not more than 1.6 mm, and even more preferably not more than 1.4 mm. If the intermediate layer is too thin, the durability to cracking on repeated impact may worsen, or the feel of the ball at impact may worsen. On the other hand, if the intermediate layer is too thick, the spin rate may rise on full shots, possibly resulting in a poor distance.

The intermediate layer-encased sphere has a deflection when compressed under a final load of 1,275 N (130 kgf) from an initial load state of 98 N (10 kgf) which, although not particularly limited, may be set within the range of 2.3 to 7.4 mm. The lower limit may be set to preferably at least 2.8 mm, and more preferably at least 3.5 mm. The upper limit may be set to preferably not more than 5.6 mm, and more preferably not more than 4.6 mm. If the intermediate layer-encased sphere is harder than the above range (i.e., the deflection is too small), the spin rate on full shots may rise excessively, resulting in a poor distance, or the feel of the ball at impact may be too hard. On the other hand, if the intermediate layer-encased sphere is softer than the above range (i.e., the deflection is too large), the feel at impact may be too soft or the durability to cracking on repeated impact may worsen.

The structure of the above-described intermediate layer is not limited to a single layer; where necessary, two or more like or unlike intermediate layers may be formed within the above-described range. By forming the intermediate layer as a plurality of layers, the spin rate on shots with a driver can be raised or lowered so as to further increase the distance. Moreover, the spin performance and feel of the ball at impact can be further improved.

Next, the material that forms the cover of the inventive golf ball is described. In this invention, the cover is formed of a resin composition obtained by blending together an ionomer resin as the chief material and a specific granular inorganic filler as a reinforcement. The cover-forming material is described below in detail.

The ionomer resin is not subject to any particular limitation, and may be a known product. Commercial products that may be used as the ionomer resin include, for example, H1706, H1605, H1557, H1601, AM7329, AM7317 and AM7318, all of which are available from DuPont-Mitsui Polychemicals Co.

The granular inorganic filler is an ingredient that is included as a reinforcement. Although not subject to particular limitation, suitable use can be made of, for example, zinc oxide, barium sulfate or titanium dioxide.

The granular inorganic filler has an average particle diameter which, although not particularly limited, may be set to preferably from 0.01 to 100 µm, and more preferably from 0.1 to 10 µm. If the average particle diameter of the granular inorganic filler is too small or too large, the dispersibility during preparation of the material may worsen. Here, "average particle diameter" refers to the particle diameter determined by dispersion, together with a suitable dispersant, in an aqueous solution, and measurement with a particle size analyzer.

The amount of granular inorganic filler included, although not particularly limited, is set to preferably at least 5 parts by weight, more preferably at least 10 parts by weight, and even more preferably at least 15 parts by weight, per 100 parts by weight of the resin component of the cover-forming material. The upper limit is set to generally not more than 40 parts by weight, preferably not more than 30 parts by weight, and even more preferably not more than 25 parts by weight. If the amount of granular inorganic filler included is too small, it may not be possible to obtain a sufficient reinforcing effect. On the other hand, if the amount of granular inorganic filler included is too large, this may have an adverse influence on the dispersibility and resilience.

The specific gravity of the granular inorganic filler, although not particularly limited, is set to preferably not more than 4.8. The lower limit may be set to preferably at least 3.0. If the specific gravity of the granular inorganic filler is too high, the cover-forming material may become very heavy, as a result of which the weight of the overall ball may end up exceeding the regulation weight.

Various additives may be optionally included in this cover-forming material. For example, pigments, dispersants, antioxidants, light stabilizers, ultraviolet absorbers and internal mold lubricants may be suitably included.

The specific gravity of the cover-forming material, although not particular limited, is set to preferably at least 0.97, more preferably from 1.00 to 1.50, and even more preferably from 1.03 to 1.20. If the specific gravity of the cover-forming material is too small, the reinforcing effect may be inadequate, as a result of which the durability of the ball to repeated impact may worsen. On the other hand, if the specific gravity of the cover-forming material is too large, the rebound may decrease, as a result of which a good distance may not be achieved.

The method of molding the cover may entail, for example, feeding the cover-forming material to an injection molding machine, and injecting the molten material over the intermediate layer that has been formed as described above. In this case, although the molding temperature varies depending on the type of resin and the compounding ratio of ingredients therein, it can generally be set within the range of 150 to 250° C.

The cover has a material hardness, expressed in terms of the Shore D hardness, which, although not particularly limited, may be set to preferably more than 60, more preferably at least 62, and even more preferably at least 63. The cover material hardness has an upper limit, expressed in terms of the Shore D hardness, which, although not particularly limited, may be set to not more than 70, and preferably not more than 67. If the material hardness of the cover is too low, the spin receptivity of the ball may be too high, possibly resulting in a poor rebound and a drop in distance, or the scuff resistance may worsen. On the other hand, if the material hardness of the cover is too high, the durability to cracking under repeated impact may worsen, or the feel of the ball in the short game and on shots with a putter may worsen.

The cover thickness, although not particularly limited, is set to preferably at least 0.5 mm, more preferably at least 0.7 mm, and even more preferably at least 1.0 mm. The upper limit is set to preferably not more than 2.0 mm, more preferably not more than 1.5 mm, and even more preferably not more than 1.3 mm. If the cover is too thin, the durability to cracking on repeated impact may worsen. On the other hand, if the cover is too thick, the spin rate on shots with a driver (W#1) may become too high, resulting in a poor distance, or the feel of the ball in the short game and on shots with a putter may become too hard.

The cover is not limited to a single-layer structure; where necessary, the cover may be constructed of two or more layers composed of like or unlike materials. In such a case, at least one layer should serve as the cover formed of the above resin blend. Moreover, it is recommended that the hardness and thickness of the coverall cover be adjusted within the above-indicated ranges.

In the golf ball of the invention, the hardnesses, thicknesses, initial velocities and specific gravities of the core, envelope layer, intermediate layer and cover satisfy the subsequently described relationships. The hardness, thickness, initial velocity and specific gravity relationships of the respective layers are described below.

In this invention, it is critical for the surface hardnesses of the core, envelope layer, intermediate layer and cover to satisfy the relationship:

core surface hardness>envelope layer surface hardness<intermediate layer surface hardness<cover surface hardness.

Unless the surface hardnesses of the respective layers satisfy the above relationship, it is not possible to achieve a good flight on shots by both mid head-speed and low head-speed golfers and to obtain a feel at impact that is both soft and solid.

The surface hardness of the intermediate layer and the surface hardness of the cover, although not subject to any particular limitation, preferably satisfy, in terms of Shore D hardnesses, the relationship:

5≤(cover surface hardness−intermediate layer surface hardness)≤20.

The lower limit of the above value is more preferably at least 8, and even more preferably at least 10. The upper limit of the above value is more preferably not more than 18, and even more preferably not more than 15. If the above value is too small, the spin rate on full shots may become too high, resulting in a poor distance, and a soft feel at impact may not be obtained. On the other hand, if the above value is too large, the spin rate on full shots may become too high, resulting in a poor distance, and the durability to cracking on repeated impact may worsen.

The surface hardness of the envelope layer and the surface hardness of the intermediate layer, although not subject to any particular limitation, preferably satisfy, in terms of Shore D hardnesses, the relationship:

10≤(intermediate layer surface hardness−envelope layer surface hardness)≤50.

The lower limit of the above value is more preferably at least 15, and even more preferably at least 20. The upper limit of the above value is more preferably not more than 40, and even more preferably not more than 30. If the above value is too small, it may not be possible to obtain a feel at impact that is both soft and solid. On the other hand, if the above value is too large, a good distance may not be obtained and the durability to cracking on repeated impact may worsen.

It is critical for the surface hardness of the core and the surface hardness of the envelope layer, expressed as Shore D hardnesses, to satisfy the relationship:

−40≤(envelope layer surface hardness−core surface hardness)≤−5.

This value has a lower limit of preferably at least −30, and more preferably at least −20, and has an upper limit of preferably not more than −8, and more preferably not more than −10. If the above value is too small, a feel at impact that is both soft and solid cannot be obtained, and good flight is not obtained when the ball is struck at a low head speed. On the other hand, if the above value is too large, the spin rate on full shots becomes too large, as a result of which a good distance is not achieved.

It is critical for the initial velocity of the core and the initial velocity of the ball to satisfy the relationship:

−0.6 m/s≤(ball initial velocity−core initial velocity)≤0 m/s.

This value has a lower value of preferably at least −0.5 m/s, and more preferably at least −0.4 m/s, and has an upper limit of preferably not more than −0.1 m/s, and more preferably not more than −0.2 m/s. If this value is too small, the rebound of the ball as a whole becomes low and the spin rate on full shots increases excessively, as a result of which a good distance is not achieved. On the other hand, if this value is too large, the cover becomes hard and the durability to cracking under repeated impact worsens.

It is critical for the initial velocity of the sphere obtained by peripherally covering the core with the envelope layer and the intermediate layer (intermediate layer-encased sphere) and the initial velocity of the ball to satisfy the relationship:

−0.4 m/s≤(ball initial velocity−intermediate layer-encased sphere initial velocity)≤0.4 m/s.

This value has a lower value of preferably at least −0.3 m/s, and more preferably at least −0.2 m/s, and has an upper limit of preferably not more than 0.3 m/s, and more preferably not more than 0.2 m/s. If this value is too small, the cover becomes softer, as a result of which the spin rate on full shots rises, making it impossible to achieve a good distance, and a solid feel is not obtained. On the other hand, if this value is too large, the spin rate-lowering effect on full shots is inadequate, as a result of which a good distance is not obtained, and the cover becomes too hard, resulting in a poor durability to cracking on repeated impact.

It is critical for the initial velocity of the sphere obtained by peripherally covering the core with the envelope layer (envelope layer-encased sphere) and the initial velocity of the intermediate layer-encased sphere to satisfy the relationship:

−0.2 m/s≤(intermediate layer-encased sphere initial velocity−envelope layer-encased sphere initial velocity).

This value has a lower limit of preferably at least 0 m/s, and more preferably at least 0.2 m/s. If this value is too small, the spin rate-lowering effect on full shots is inadequate, as a result of which a good distance is not obtained.

The initial velocity of the envelope layer-encased sphere and the initial velocity of the ball, although not subject to any particular limitation, preferably satisfy the relationship:

0.1 m/s≤(ball initial velocity−envelope layer-encased sphere initial velocity)≤0.8 m/s.

This value has a lower limit of more preferably at least 0.2 m/s, and even more preferably at least 0.3 m/s, and has an upper limit of more preferably not more than 0.7 m/s, and even more preferably not more than 0.6 m/s. If this value is too small, the spin rate on full shots may rise excessively, as a result of which a good distance may not be achieved. On the other hand, if this value is too large, the feel at impact may become too hard or the durability of the ball on repeated impact may worsen.

The initial velocity of the core and the initial velocity of the envelope layer-encased sphere, although not subject to any particular limitation, preferably satisfy the relationship:

−1 m/s≤(initial velocity of envelope layer-encased sphere−initial velocity of core)≤−0.4 m/s.

This value has a lower limit of more preferably at least −0.9 m/s, and even more preferably at least −0.8 m/s, and has an upper limit of more preferably not more than −0.5 m/s, and even more preferably not more than −0.6 m/s. If this value is too small, the ball rebound may become too low or the spin rate on full shots may become too high, possibly resulting in a poor distance. On the other hand, if this value is too large, it may not be possible to achieve a feel at impact that is both soft and solid.

As used herein, "initial velocity" refers to the initial velocity measured using an initial velocity measuring apparatus of the same type as a United States Golf Association (USGA) drum rotation type initial velocity instrument, and by the method of measurement set forth in the initial velocity rule for golf balls established by the USGA.

The specific gravity of the intermediate layer and the specific gravity of the cover, although not subject to any particular limitation, preferably satisfy the relationship:

cover specific gravity≥intermediate layer specific gravity.

These specific gravities more preferably satisfy the relationship:

cover specific gravity>intermediate layer specific gravity;

and it is recommended that they satisfy the relationship 0.05≤(cover specific gravity−intermediate layer specific gravity).

When the relationship between the specific gravity of the intermediate layer and the specific gravity of the cover falls outside the above relationship, the durability to cracking under repeated impact may worsen and the resilience may decrease, as a result of which a good distance may not be achieved.

The specific gravities of the core, the envelope layer and the cover, although not subject to any particular limitation, may both be set to preferably at least 1.0, more preferably at least 1.02, and even more preferably at least 1.04. The upper limit may be set to preferably not more than 1.4, more preferably not more than 1.3, and even more preferably not more than 1.2. At core, envelope layer and cover specific gravities outside of the above ranges, the desired flight, feel at impact and durability to cracking with repeated impact may not all be achievable.

The specific gravity of the intermediate layer, although not subject to any particular limitation, may be set to preferably at least 0.9, more preferably at least 0.92, and even more preferably at least 0.95. The upper limit may be set to preferably not more than 1.2, more preferably not more than 1.1, and even more preferably not more than 1.0. If the specific gravity of the intermediate layer falls outside of the above range, the rebound may decrease, as a result of which a good distance may not be achieved, and the durability to cracking on repeated impact may worsen.

The thickness of the envelope layer, the thickness of the intermediate layer and the thickness of the cover are not subject to any particular limitation, although they preferably satisfy the relationship:

envelope layer thickness≤intermediate layer thickness≤cover thickness;

and more preferably satisfy the relationship:

envelope layer thickness<intermediate layer thickness≤cover thickness.

In cases where the envelope layer thickness, intermediate layer thickness and cover thickness do not satisfy the above relationship, the spin rate on full shots may rise excessively, as a result of which a good distance may not be achieved.

The deflection of the core and the deflection of the envelope layer-encased sphere are not subject to any particular limitation, although they preferably satisfy the relationship:

−0.6 mm≤(core deflection−envelope layer-encased sphere deflection)≤0.5 mm.

The lower limit of this value is more preferably at least −0.4 mm, and even more preferably at least −0.2 mm. The upper limit is more preferably not more than 0.4 mm, and even more preferably not more than 0.2 mm. If this value is too small, it may not be possible to achieve a feel at impact that is both soft and solid. On the other hand, if this value is too large, the durability to cracking under repeated impact may worsen and it may not be possible to achieve a feel at impact that is both soft and solid.

In the golf ball of the invention, as with ordinary golf balls, it is desirable to form numerous dimples on the surface of the cover in order to further improve the aerodynamic properties and increase the distance. By optimizing the number of dimple types and the total number of dimples, owing to synergistic effects with the above-described ball construction, a golf ball having a more stable trajectory and an excellent distance performance can be obtained.

The number of dimples, although not subject to any particular limitation, may be set to preferably at least 280, more preferably at least 300, and even more preferably at least 320. The maximum number of dimples may be set to preferably not more than 360, more preferably not more than 350, and even more preferably not more than 340. If the number of dimples is larger than the above range, the trajectory of the ball may become low, as a result of which a good distance may not be achieved. On the other hand, if the number of dimples is smaller than the above range, the trajectory may become high, as a result of which an increased distance may not be achieved.

The dimple shapes that are used may be of one type or a combination of two or more types selected from among not only circular shapes, but also various polygonal shapes as well as dewdrop shapes and oval shapes.

The dimple diameter is not particularly limited. However, in cases where circular dimples are used, the diameter is preferably set to from about 2.5 mm to about 6.5 mm. Similarly, the dimple depth, although not subject to any particular limitation, is preferably set in the range of from 0.08 to 0.30 mm.

To improve aerodynamic performance, the dimple surface coverage (SR), defined as the total surface area on the surface of a hypothetical sphere that is circumscribed by the dimple edges as a proportion of the surface area of the hypothetical sphere, although not subject to any particular limitation, is preferably set in the range of 60 to 90%.

To improve the aerodynamic performance, the dimple volume ratio (VR), defined as the sum of the volumes of individual dimple spaces below a flat plane circumscribed by the edge of each dimple on a golf ball as a proportion of the volume of the golf ball were it to have no dimples on the surface (hypothetical sphere), although not subject to any particular limitation, is preferably set in the range of 0.6 to 1%.

Also, to optimize the ball trajectory, the value $V_0$ for each dimple, defined as the spatial volume of the dimple below the flat plane circumscribed by the dimple edge, divided by the volume of the cylinder whose base is the flat plane and whose height is the maximum depth of the dimple from the base, although not subject to any particular limitation, is preferably set in the range of 0.35 to 0.80.

If the foregoing dimple parameters such as the number and shape of the dimples do not satisfy the above conditions, a trajectory that fails to provide a good distance may arise, as a result of which a satisfactory distance may not be achieved.

Also, in this invention, the cover of the golf ball may be subjected to various types of treatment, such as surface preparation, stamping and painting, in order to enhance the design and durability of the ball.

The golf ball of the invention, which can be manufactured in conformity with the Rules of Golf for competitive play, may be formed to a diameter of at least 42.67 mm. The weight may be set to generally at least 45.0 g, and preferably at least 45.2 g. The upper limit is preferably set to not more than 45.93 g.

EXAMPLES

The following Examples and Comparative Examples are provided to illustrate the invention, and are not intended to limit the scope thereof.

Examples 1 and 2, Comparative Examples 1 to 7

Formation of the Core

In each example, a solid core was produced by preparing the rubber composition shown in Table 1, then molding and vulcanizing under vulcanization conditions of 155° C. and 15 minutes.

TABLE 1

| | Material | No. 1 | No. 2 | No. 3 | No. 4 | No. 5 | No. 6 | No. 7 | No. 8 | No. 9 |
|---|---|---|---|---|---|---|---|---|---|---|
| Formulation (pbw) | Polybutadiene A | 80 | 80 | 80 | 100 | 80 | 90 | 80 | 80 | 80 |
| | Polybutadiene B | 20 | 20 | 20 | 0 | 20 | 0 | 20 | 5 | 20 |
| | Polyisoprene rubber | 0 | 0 | 0 | 0 | 0 | 10 | 0 | 15 | 0 |
| | Zinc acrylate | 24 | 20 | 24 | 27 | 23 | 22.5 | 24 | 24 | 24 |
| | Organic Peroxide 1 | 0.6 | 0.6 | 0.6 | 0.6 | 0.6 | 0.6 | 0.6 | 0.6 | 0.6 |
| | Organic Peroxide 2 | 0.6 | 0.6 | 0.6 | 0.6 | 0.6 | 0.6 | 0.6 | 0.6 | 0.6 |
| | Antioxidant | 0.1 | 0.1 | 0.1 | 0 | 0.1 | 0.1 | 0.1 | 0.1 | 0.1 |
| | Barium sulfate | 23.5 | 25.2 | 21.2 | 0 | 27.2 | 18.2 | 23.5 | 23.5 | 23.5 |
| | Zinc oxide | 4 | 4 | 4 | 24 | 4 | 4 | 4 | 4 | 4 |
| | Zinc salt of pentachlorothiophenol | 0.1 | 0.1 | 0.1 | 0.7 | 0 | 0 | 0.1 | 0.1 | 0.1 |

The ingredients in Table 1 are described below.

Polybutadiene A: Available under the trade name "BR01" from JSR Corporation.

Polybutadiene B: Available under the trade name "BR51" from JSR Corporation

Polyisoprene rubber: Available under the trade name "IR2200" from JSR Corporation.

Organic Peroxide 1: Dicumyl peroxide; available under the trade name "Percumyl D" from NOF Corporation.

Organic Peroxide 2: A mixture of 1,1-di(t-butylperoxy)-cyclohexane and silica, available under the trade name "Perhexa C-40" from NOF Corporation.

Antioxidant: 2,2'-Methylenebis(4-methyl-6-t-butylphenol), available under the trade name "Noorac NS-6" from Ouchi Shinko Chemical Industry Co., Ltd.

Formation of Envelope Layer

Next, an envelope layer-forming material formulated as shown in Table 2 was injection-molded over the core obtained above to form an envelope layer, thereby giving an envelope layer-encased sphere.

TABLE 2

| | | Material | | |
|---|---|---|---|---|
| | | A | B | C |
| Formulation (pbw) | Hytrel 3046 | 100 | | |
| | Hytrel 4047 | | 100 | |
| | Nucrel AN4319 | | | 100 |
| | Magnesium stearate | | | 70 |
| | Magnesium oxide | | | 1.9 |
| | Titanium oxide | | | 1.5 |

The materials in Table 2 are described below.

Hytrel: Thermoplastic polyether ester elastomers available from Du-Pont Toray Co., Ltd.

Nucrel AN4319: Available from DuPont-Mitsui Polychemicals Co., Ltd.

Formation of Intermediate Layer

Next, an intermediate layer-forming material formulated as shown in Table 3 was injection-molded over the envelope layer-encased sphere obtained above, thereby forming an intermediate layer-encased sphere.

TABLE 3

| | | Material | | |
|---|---|---|---|---|
| | | D | E | K |
| Formulation (pbw) | HPF 1000 | 100 | | |
| | Nucrel AN4319 | | 100 | 20 |
| | Himilan 1557 | | | 20 |

TABLE 3-continued

| | Material | | |
|---|---|---|---|
| | D | E | K |
| Himilan 1855 | | | 30 |
| Surlyn 8120 | | | 30 |
| Magnesium stearate | | 70 | |
| Magnesium oxide | | 1.9 | |

The materials in Table 3 are described below.

HPF 1000: Available from E.I. DuPont de Nemours & Co.; a terpolymer composed of about 75 to 76 wt % of ethylene, about 8.5 wt % of acrylic acid and about 15.5 to 16.5 wt % of n-butyl acrylate, in which all (100%) of the acid groups are neutralized with magnesium ions.

Nucrel AN4319: Available from DuPont-Mitsui Polychemicals Co., Ltd.

Himilan 1557: An ionomer resin available from DuPont-Mitsui Polychemicals Co., Ltd.

Himilan 1855: An ionomer resin available from DuPont-Mitsui Polychemicals Co., Ltd.

Surlyn 8120: An ionomer resin available from E.I. DuPont de Nemours & Co.

Formation of Cover

Figure 2:
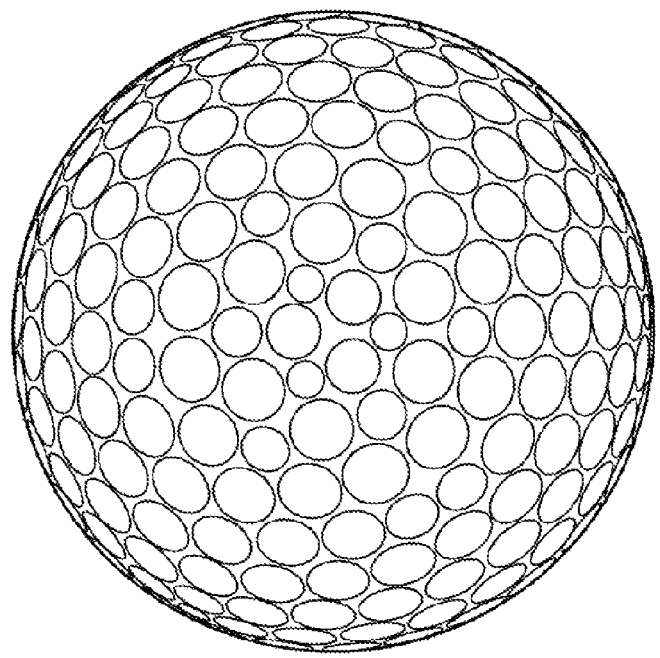
FIG. 2 is a top view showing the dimple pattern used on the balls in the examples.

Next, a cover-forming material formulated as shown in Table 4 was injection-molded over the intermediate layer-encased sphere obtained above, thereby forming a golf ball having an envelope layer, an intermediate layer and a cover over the core. At this time, the dimples shown in FIG. 2 were formed on the surface of the cover. Details on these dimples are shown in Table 5.

TABLE 4

| | | Material | | | | |
|---|---|---|---|---|---|---|
| | | F | G | H | I | J |
| Formulation (pbw) | Himilan 1706 | | 50 | | | |
| | Himilan 1557 | | | 50 | | |
| | Himilan 1605 | 50 | 50 | 50 | | |
| | AM7329 | 50 | | | | |
| | AM7327 | | | | 100 | |
| | AM7317 | | | | | 50 |
| | AM7318 | | | | | 50 |
| | Polyethylene wax | 1 | 2 | | 1 | 1 |
| | Precipitated barium sulfate | 20 | | | 20 | 20 |
| | Magnesium stearate | 1 | 0.4 | 1.3 | 1 | 1 |
| | Titanium oxide | | | 4.8 | 2.8 | |

The materials in Table 4 are described below.

Himilan 1706: An ionomer resin available from DuPont-Mitsui Polychemicals Co., Ltd.

Himilan 1557: An ionomer resin available from DuPont-Mitsui Polychemicals Co., Ltd.

Himilan 1605: An ionomer resin available from DuPont-Mitsui Polychemicals Co., Ltd.

AM7329: An ionomer resin available from DuPont-Mitsui Polychemicals Co., Ltd.

AM7327: An ionomer resin available from DuPont-Mitsui Polychemicals Co., Ltd.

AM7317: An ionomer resin available from DuPont-Mitsui Polychemicals Co., Ltd.

AM7318: An ionomer resin available from DuPont-Mitsui Polychemicals Co., Ltd.

Polyethylene wax: Available under the trade name "Sanwax 161P" from Sanyo Chemical Industries, Ltd.

TABLE 5

| No. | Number of dimples | Diameter (mm) | Depth (mm) | $V_0$ | SR (%) | VR (%) |
|---|---|---|---|---|---|---|
| 1 | 12 | 4.6 | 0.15 | 0.47 | 81 | 0.783 |
| 2 | 234 | 4.4 | 0.15 | 0.47 | | |
| 3 | 60 | 3.8 | 0.14 | 0.47 | | |
| 4 | 6 | 3.5 | 0.13 | 0.46 | | |
| 5 | 6 | 3.4 | 0.13 | 0.46 | | |
| 6 | 12 | 2.6 | 0.10 | 0.46 | | |
| Total | 330 | | | | | |

Dimple Definitions

Diameter: Diameter of flat plane circumscribed by edge of dimple.

Depth: Maximum depth of dimple from flat plane circumscribed by edge of dimple.

$V_0$: Spatial volume of dimple below flat plane circumscribed by dimple edge, divided by volume of cylinder whose base is the flat plane and whose height is the maximum depth of dimple from the base.

SR: Sum of individual dimple surface areas, each defined by the flat plane circumscribed by the edge of the dimple, as a percentage of the surface area of a hypothetical sphere were the ball to have no dimples on the surface thereof.

VR: Sum of spatial volumes of individual dimples formed below flat plane circumscribed by the edge of the dimple, as a percentage of the volume of a hypothetical sphere were the ball to have no dimples on the surface thereof.

The following measurements and evaluations were carried out on the golf balls thus obtained. The results are shown in Tables 6 to 8.

Diameters of Core, Envelope-Encased Sphere and Intermediate Layer-Encased Sphere The diameter at five random places on the surface of a single core, a single envelope layer-encased sphere or a single intermediate layer-encased sphere was measured at a temperature of 23.9±1° C., and the average of the five measurements was determined. Next, the average measured values thus obtained for five individual cores, five individual envelope layer-encased spheres and five individual intermediate layer-encased spheres were used to determine the average diameters of the cores, the envelope layer-encased spheres and the intermediate layer-encased spheres.

Ball Diameter

The diameters at five random dimple-free places (lands) on the surface of a ball were measured at a temperature of 23.9±1° C. and, using the average of the five measurements as the measured value for a single ball, the average diameter for five measured balls was determined.

Deflections of Core, Envelope-Encased Sphere, Intermediate Layer-Encased Sphere and Ball The core, envelope-encased sphere, intermediate layer-encased sphere or ball was placed on a hard plate, and the amount of deformation when compressed under a final load of 1,275 N (130 kgf) from an initial load state of 98 N (10 kgf) was measured for each. The amount of deformation here refers in each case to the measured value obtained after holding the test specimen isothermally at 23.9° C.

Center Hardness of Core (Shore D Hardness and JIS-C Hardness)

The hardness at the center of the cross-section obtained by cutting the core in half through the center was measured. The Shore D hardness was measured in accordance with ASTM D2240-95, and the JIS-C hardness was measured in accordance with JIS K 6301-1975.

Surface Hardness of Core (Shore D Hardness and JIS-C Hardness)

Measurements were taken by pressing the durometer indenter perpendicularly against the surface of the spherical core. The Shore D hardness was measured in accordance with ASTM D2240-95, and the JIS-C hardness was measured in accordance with JIS K 6301-1975.

Surface Hardnesses (Shore D Hardnesses) of Envelope Layer-Encased Sphere, Intermediate Layer-Encased Sphere and Ball (Cover)

Measurements were taken by pressing the durometer indenter perpendicularly against the surface of the envelope-encased sphere, the intermediate layer-encased sphere or the ball (cover). The surface hardness of the ball (cover) is the measured value obtained at dimple-free (land) areas on the ball surface. The Shore D hardnesses were measured in accordance with ASTM D2240-95.

Material Hardnesses (Shore D Hardnesses) of Envelope Layer, Intermediate Layer and Cover The resin materials for, respectively, the envelope layer, the intermediate layer and the cover were formed into sheets having a thickness of 2 mm and left to stand for at least two weeks, following which the Shore D hardnesses were measured in accordance with ASTM D2240-95.

Initial Velocities

The initial velocities were measured using an initial velocity measuring apparatus of the same type as the USGA drum rotation-type initial velocity instrument approved by the R&A. The core, envelope layer-encased sphere, intermediate layer-encased sphere and ball (all of which are referred to here as "test specimens") were held isothermally in a 23.9±1° C. environment for at least 3 hours, then tested in a chamber at a room temperature of 23.9±2° C. Each test specimen was hit using a 250-pound (113.4 kg) head (striking mass) at an impact velocity of 143.8 ft/s (43.83 m/s). One dozen test specimens were each hit four times. The time taken for the test specimen to traverse a distance of 6.28 ft (1.91 m) was measured and used to compute the initial velocity (m/s). This cycle was carried out over a period of about 15 minutes.

Flight Performance

A driver (W#1) was mounted on a golf swing robot, and the distances traveled by balls when hit at head speeds (HS) of 40 m/s and 30 m/s were measured. The club used was a TourStage PHYZ driver (2011 model; loft angle, 11.5°) manufactured by Bridgestone Sports Co., Ltd. The flight performance was rated according to the following criteria.

HS 40 m/s
 Good: Total distance was 199 m or more
 NG: Total distance was 198 m or less
HS 35 m/s
 Good: Total distance was 136 m or more
 NG: Total distance was 135 m or less Feel Using a driver (W#1), sensory evaluations were carried out under the following criteria by amateur golfers having head speeds of 30 to 40 m/s.
 Good: Feel at impact was good, combining both a soft and solid feel
 NG: Either the soft feel or the solid feel was inadequate Durability to Cracking The ball was repeatedly hit at a head speed of 35 m/s with a driver (W#1) mounted on a golf swing robot. The club used was a TourStage PHYZ driver (2011 model; loft angle 11.5°) manufactured by Bridgestone Sports Co., Ltd. For the ball in each example, a loss of durability was judged to have occurred when the initial velocity of the ball fell to or below 97% of the average initial velocity for the first ten shots. Based on the number of shots taken when a loss of durability occurred, the durability indexes for the balls in the respective examples were calculated relative to an arbitrary index of 100 for the number of shots taken with the ball in Example 2. The durability to cracking was rated as shown in Table 8 according to the criteria shown below. The average value for N=3 balls was used as the basis for evaluation in each example.

Good: Durability index was 95 or more
 Fair: Durability index was at least 90 but less than 95
 NG: Durability index was less than 90

TABLE 6

|  |  | Example | |
| --- | --- | --- | --- |
|  |  | 1 | 2 |
| Structure |  | 4 layers | 4 layers |
| Core | Material | No. 1 | No. 2 |
|  | Diameter (mm) | 35.2 | 35.2 |
|  | Weight (g) | 27.2 | 27.2 |
|  | Specific gravity | 1.19 | 1.19 |
|  | Deflection (mm) | 4.0 | 4.5 |
|  | Initial velocity (m/s) | 77.7 | 77.5 |
|  | Surface hardness (JIS-C) | 76 | 73 |
|  | Center hardness (JIS-C) | 60 | 57 |
|  | Surface hardness − Center hardness | 16 | 15 |
|  | Surface hardness (Shore D) | 49 | 47 |
| Envelope layer | Material | A | A |
|  | Thickness (mm) | 1.20 | 1.20 |
|  | Specific gravity | 1.07 | 1.07 |
|  | Weight (g) | 5.35 | 5.35 |
|  | Material hardness (Shore D) | 27 | 27 |
| Envelope layer-encased sphere | Diameter (mm) | 37.60 | 37.60 |
|  | Weight (g) | 32.55 | 32.55 |
|  | Deflection (mm) | 3.9 | 4.25 |
|  | Initial velocity (m/s) | 76.9 | 76.9 |
|  | Surface hardness (Shore D) | 33 | 33 |
| Envelope layer surface hardness − Core surface hardness (Shore D) |  | −16 | −14 |
| Envelope layer-encased sphere initial velocity − Core initial velocity (m/s) |  | −0.8 | −0.6 |
| Core deflection − Envelope layer-encased sphere deflection (mm) |  | 0.1 | 0.2 |
| Intermediate layer | Material | D | D |
|  | Thickness (mm) | 1.27 | 1.27 |
|  | Specific gravity | 0.96 | 0.96 |
|  | Material hardness (Shore D) | 50 | 50 |
| Intermediate layer-encased sphere | Diameter (mm) | 40.14 | 40.14 |
|  | Weight (g) | 38.35 | 38.35 |
|  | Deflection (mm) | 3.7 | 4.1 |
|  | Initial velocity (m/s) | 77.2 | 77.3 |
|  | Surface hardness (Shore D) | 56 | 56 |
| Intermediate layer surface hardness − Envelope layer surface hardness (Shore D) |  | 23 | 23 |
| Intermediate layer-encased sphere initial velocity − Envelope layer-encased sphere initial velocity (m/s) |  | 0.3 | 0.4 |
| Cover | Material | F | F |
|  | Thickness (mm) | 1.28 | 1.28 |
|  | Specific gravity | 1.05 | 1.05 |
|  | Material hardness (Shore D) | 63 | 63 |
| Ball | Diameter (mm) | 42.70 | 42.70 |
|  | Weight (g) | 45.4 | 45.4 |
|  | Deflection (mm) | 3.2 | 3.4 |
|  | Initial velocity (m/s) | 77.3 | 77.3 |
|  | Surface hardness (Shore D) | 69 | 69 |
| Cover specific gravity − Intermediate layer specific gravity |  | 0.09 | 0.09 |
| Ball surface hardness − Intermediate layer surface hardness (Shore D) |  | 13 | 13 |
| Ball initial velocity − Core initial velocity (m/s) |  | −0.4 | −0.2 |
| Ball initial velocity − Envelope layer-encased sphere initial velocity (m/s) |  | 0.4 | 0.4 |
| Ball initial velocity − Intermediate layer-encased sphere initial velocity (m/s) |  | 0.1 | 0.0 |

TABLE 7

| | | Comparative Example | | | | | | |
|---|---|---|---|---|---|---|---|---|
| | | 1 | 2 | 3 | 4 | 5 | 6 | 7 |
| Structure | | 4 layers | 3 layers | 3 layers | 2 layers | 4 layers | 4 layers | 4 layers |
| Core | Material | No. 3 | No. 4 | No. 5 | No. 6 | No. 7 | No. 8 | No. 9 |
| | Diameter (mm) | 35.2 | 35.2 | 37.3 | 39.3 | 35.2 | 35.2 | 35.2 |
| | Weight (g) | 26.9 | 27.2 | 32.7 | 36.8 | 27.2 | 27.2 | 27.2 |
| | Specific gravity | 1.18 | 1.19 | 1.20 | 1.16 | 1.19 | 1.19 | 1.19 |
| | Deflection (mm) | 4.1 | 3.8 | 4.1 | 4.0 | 4.0 | 4.5 | 4.0 |
| | Initial velocity (m/s) | 77.9 | 78.1 | 77.4 | 76.8 | 77.7 | 76.9 | 77.7 |
| | Surface hardness (JIS-C) | 75 | 77 | 75 | 76 | 76 | 73 | 76 |
| | Center hardness (JIS-C) | 59 | 61 | 59 | 60 | 60 | 57 | 60 |
| | Surface hardness − Center hardness | 16 | 16 | 16 | 16 | 16 | 15 | 16 |
| | Surface hardness (Shore D) | 49 | 51 | 49 | 49 | 49 | 47 | 49 |
| Envelope layer | Material | B | A | C | — | A | A | A |
| | Thickness (mm) | 1.20 | 1.68 | 1.35 | — | 1.20 | 1.20 | 1.20 |
| | Specific gravity | 1.12 | 1.07 | 0.98 | — | 1.07 | 1.07 | 1.07 |
| | Weight (g) | 5.60 | 7.69 | 6.18 | — | 5.35 | 5.35 | 5.35 |
| | Material hardness (Shore D) | 40 | 27 | 49 | — | 27 | 27 | 27 |
| Envelope layer-encased sphere | Diameter (mm) | 37.60 | 38.56 | 40.00 | — | 37.60 | 37.60 | 37.60 |
| | Weight (g) | 32.50 | 34.89 | 38.90 | — | 32.55 | 32.55 | 32.55 |
| | Deflection (mm) | 3.90 | 3.74 | 3.85 | — | 3.90 | 4.25 | 3.90 |
| | Initial velocity (m/s) | 77.3 | 77.2 | 77.1 | — | 76.9 | 76.4 | 76.9 |
| | Surface hardness (Shore D) | 46 | 33 | 55 | — | 33 | 33 | 33 |
| Envelope layer surface hardness − Core surface hardness (Shore D) | | −3 | −18 | 6 | — | −16 | −14 | −16 |
| Envelope layer-encased sphere initial velocity − Core initial velocity (m/s) | | −0.6 | −0.9 | −0.3 | — | −0.8 | −0.5 | −0.8 |
| Core deflection − Envelope layer-encased sphere deflection (mm) | | 0.2 | 0.0 | 0.3 | — | 0.1 | 0.2 | 0.1 |
| Intermediate layer | Material | E | — | — | — | D | D | K |
| | Thickness (mm) | 1.20 | — | — | — | 1.27 | 1.27 | 1.27 |
| | Specific gravity | 0.97 | — | — | — | 0.96 | 0.96 | 0.96 |
| | Material hardness (Shore D) | 49 | — | — | — | 50 | 50 | 50 |
| Intermediate layer-encased sphere | Diameter (mm) | 40.00 | — | — | — | 40.14 | 40.14 | 40.14 |
| | Weight (g) | 38.00 | — | — | — | 38.35 | 38.35 | 38.35 |
| | Deflection (mm) | 3.7 | — | — | — | 3.7 | 4.1 | 3.7 |
| | Initial velocity (m/s) | 77.3 | — | — | — | 77.2 | 76.8 | 76.6 |
| | Surface hardness (Shore D) | 55 | — | — | — | 56 | 56 | 56 |
| Intermediate layer surface hardness − Envelope layer surface hardness (Shore D) | | 9 | — | — | — | 23 | 23 | 23 |
| Intermediate layer-encased sphere initial velocity − Envelope layer-encased sphere initial velocity (m/s) | | 0.0 | — | — | — | 0.3 | 0.4 | −0.3 |
| Cover | Material | F | G | H | G | I | J | F |
| | Thickness (mm) | 1.35 | 2.06 | 1.35 | 1.7 | 1.28 | 1.28 | 1.28 |
| | Specific gravity | 1.05 | 0.97 | 0.92 | 0.97 | 1.05 | 1.05 | 1.05 |
| | Material hardness (Shore D) | 63 | 63 | 61 | 63 | 48 | 66 | 63 |
| Ball | Diameter (mm) | 42.70 | 42.70 | 42.70 | 42.70 | 42.70 | 42.70 | 42.70 |
| | Weight (g) | 45.4 | 45.3 | 45.4 | 45.3 | 45.4 | 45.4 | 45.4 |
| | Deflection (mm) | 3.0 | 3.1 | 3.3 | 3.3 | 3.5 | 3.3 | 3.2 |
| | Initial velocity (m/s) | 77.3 | 77.2 | 77.3 | 77.3 | 76.3 | 77.0 | 76.7 |
| | Surface hardness (Shore D) | 69 | 69 | 67 | 69 | 54 | 72 | 69 |
| Cover specific gravity − Intermediate layer specific gravity | | 0.08 | — | — | — | 0.09 | 0.09 | 0.09 |
| Ball surface hardness − Intermediate layer surface hardness (Shore D) | | 14 | — | — | — | −2 | 16 | 13 |
| Ball initial velocity − Core initial velocity (m/s) | | −0.6 | −0.8 | 0.0 | 0.5 | −1.4 | 0.1 | −1.0 |
| Ball initial velocity − Envelope layer-encased sphere initial velocity (m/s) | | 0.0 | 0.0 | 0.2 | — | −0.6 | 0.6 | −0.2 |
| Ball initial velocity − Intermediate layer-encased sphere initial velocity (m/s) | | 0.0 | — | — | — | −0.9 | 0.2 | 0.1 |

TABLE 8

| | | | Example | | Comparative Example | | | | | | |
|---|---|---|---|---|---|---|---|---|---|---|---|
| | | | 1 | 2 | 1 | 2 | 3 | 4 | 5 | 6 | 7 |
| Flight performance | W#1 HS, | Spin rate (rpm) | 2,821 | 2,692 | 2,821 | 2,953 | 2,846 | 2,783 | 2,989 | 2,668 | 2,875 |

TABLE 8-continued

|  |  |  | Example | | Comparative Example | | | | | | |
|---|---|---|---|---|---|---|---|---|---|---|---|
|  |  |  | 1 | 2 | 1 | 2 | 3 | 4 | 5 | 6 | 7 |
|  | 40 m/s | Total distance (m) | 202.4 | 201.1 | 201.1 | 197.9 | 200.1 | 199.6 | 194.9 | 200.7 | 197.2 |
|  |  | Rating | good | good | good | NG | good | good | NG | good | NG |
|  | W#1 HS, | Spin rate (rpm) | 2,987 | 2,896 | 3,038 | 3,075 | 2,935 | 3,045 | 3,172 | 2,869 | 3,043 |
|  | 30 m/s | Total distance (m) | 136.5 | 137.1 | 134.9 | 134.1 | 136.0 | 134.8 | 131.9 | 136.7 | 134.0 |
|  |  | Rating | good | good | NG | NG | good | NG | NG | good | NG |
| Feel at impact |  |  | good | good | good | good | NG | NG | NG | good | good |
| Durability to repeated impact |  |  | good | good | good | good | good | NG | good | NG | good |

In Comparative Example 1, the (envelope layer surface hardness−core surface hardness) value, expressed in terms of Shore D hardness, was larger than −5, and so the flight performance when the ball was struck at a low head speed was poor.

Comparative Example 2 was a three-piece golf ball without an intermediate layer. The distances traveled by the ball on shots taken in the mid head-speed range and shots taken at a low head speed were poor.

Comparative Example 3 was a three-piece golf ball without an intermediate layer. The feel of the ball at impact was inferior to that obtained using the golf balls in the working examples of the invention.

Comparative Example 4 was a two-piece golf ball lacking both an intermediate layer and an envelope layer. On shots taken at a low head speed, this ball had a poor flight performance, feel and durability to cracking under repeated impact.

Comparative Example 5 was a four-piece golf ball in which the ball surface hardness was lower than the intermediate layer surface hardness. This ball had a distance and feel at impact which were inferior to those of the balls in the working examples of the invention.

In Comparative Example 6, because the (ball initial velocity−core initial velocity) value was too large, the ball had a poor durability to cracking under repeated impact.

In Comparative Example 7, the (intermediate layer-encased sphere initial velocity−envelope layer-encased sphere initial velocity) value was small and the (ball initial velocity−intermediate layer-encased sphere initial velocity) value was too small. As a result, the ball initial velocity was insufficient and the spin rate ended up rising, making it impossible to achieve a sufficient distance.

Japanese Patent Application No. 2013-001697 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A multi-piece solid golf ball comprising a core, an envelope layer, an intermediate layer and a cover, wherein the core, the envelope layer, the intermediate layer and the cover have respective surface hardnesses which satisfy the relationship:

core surface hardness>envelope layer surface hardness<intermediate layer surface hardness<cover surface hardness;

the core surface hardness and the envelope layer surface hardness, expressed as Shore D hardnesses, satisfy the relationship:

−40≤(envelope layer surface hardness−core surface hardness)≤−5;

the core and the ball have respective initial velocities which satisfy the relationship:

−0.6 m/s≤(ball initial velocity−core initial velocity)≤0 m/s;

a sphere composed of the core covered peripherally by the envelope layer and the intermediate layer (intermediate layer-encased sphere) and the ball have respective initial velocities which satisfy the relationship:

−0.4 m/s≤(ball initial velocity−intermediate layer-encased sphere initial velocity)≤0.4 m/s; and a sphere composed of the core covered peripherally by the envelope layer (envelope layer-encased sphere) and the intermediate layer-encased sphere have respective initial velocities which satisfy the relationship:

−0.2 m/s≤(intermediate layer-encased sphere initial velocity−envelope layer-encased sphere initial velocity).

2. The multi-piece solid golf ball of claim 1, wherein the envelope layer surface hardness and the intermediate layer surface hardness, expressed as Shore D hardnesses, satisfy the relationship:

10≤(intermediate layer surface hardness−envelope layer surface hardness)≤50.

3. The multi-piece solid golf ball of claim 1, wherein the intermediate layer surface hardness and the cover surface hardness, expressed as Shore D hardnesses, satisfy the relationship:

5≤(cover surface hardness−intermediate layer surface hardness)≤20.

4. The multi-piece solid golf ball of claim 1, wherein the initial velocity of the envelope layer and the initial velocity of the ball satisfy the relationship:

0.1 m/s≤(ball initial velocity−envelope layer-encased sphere initial velocity)≤0.8 m/s;

and the core initial velocity and the ball initial velocity satisfy the relationship:

−0.5 m/s≤(ball initial velocity−core initial velocity)≤0 m/s.

5. The multi-piece solid golf ball of claim 1, wherein the envelope layer, the intermediate layer and the cover have thicknesses which satisfy the relationship:

envelope layer thickness≤intermediate layer thickness≤cover thickness.

6. The multi-piece solid golf ball of claim 1, wherein the intermediate layer and the cover have specific gravities which satisfy the relationship:

cover specific gravity≥intermediate layer specific gravity.

7. The multi-piece solid golf ball of claim 1, wherein the intermediate layer is formed of a resin composition obtained by blending as essential components:
100 parts by weight of a resin component composed of, in admixture,
- (A) a base resin of (a-1) an olefin-unsaturated carboxylic acid random copolymer and/or a metal ion neutralization product of an olefin-unsaturated carboxylic acid random copolymer mixed with (a-2) an olefin-unsaturated carboxylic acid-unsaturated carboxylic acid ester random terpolymer and/or a metal ion neutralization product of an olefin-unsaturated carboxylic acid-unsaturated carboxylic acid ester random terpolymer in a weight ratio between 100:0 and 0:100, and
- (B) a non-ionomeric thermoplastic elastomer in a weight ratio between 100:0 and 50:50;
- (C) from 5 to 80 parts by weight of a fatty acid and/or fatty acid derivative having a molecular weight of from 228 to 1500; and
- (D) from 0.1 to 17 parts by weight of a basic inorganic metal compound capable of neutralizing un-neutralized acid groups in components A and C.

8. The multi-piece solid golf ball of claim 1, wherein the envelope layer is formed of a thermoplastic polyether ester elastomer.

9. The multi-piece solid golf ball of claim 1, wherein the cover is formed of a resin composition obtained by blending together an ionomer resin and a granular inorganic filler.

* * * * *